(12) United States Patent
Heren (10) Patent No.: US 9,410,558 B2
(45) Date of Patent: Aug. 9, 2016

(54) APPARATUS FOR RECOVERING ENERGY

(71) Applicant: Poclain Hydraulics Industrie, Verberie (FR)

(72) Inventor: Jean Heren, Margny les Compiegne (FR)

(73) Assignee: Poclain Hydraulics Industrie, Verberie (FR)

( * ) Notice: Subject to any disclaimer, the term of this patent is extended or adjusted under 35 U.S.C. 154(b) by 349 days.

(21) Appl. No.: 13/910,849

(22) Filed: Jun. 5, 2013

(65) Prior Publication Data

US 2013/0327030 A1 Dec. 12, 2013

(30) Foreign Application Priority Data

Jun. 6, 2012 (FR) ...................................... 12 55268

(51) Int. Cl.
| | |
|---|---|
| *F15B 1/02* | (2006.01) |
| *B60K 6/12* | (2006.01) |
| *F02N 7/00* | (2006.01) |
| *F16H 61/4148* | (2010.01) |

(52) U.S. Cl.
CPC ... *F15B 1/02* (2013.01); *B60K 6/12* (2013.01); *F02N 7/00* (2013.01); *F16H 61/4148* (2013.01); *Y02T 10/6208* (2013.01)

(58) Field of Classification Search
CPC ....... F15B 21/14; F15B 2211/88; F15B 15/18
USPC .......................................................... 60/416
See application file for complete search history.

(56) References Cited

U.S. PATENT DOCUMENTS

| | | | | |
|---|---|---|---|---|
| 4,731,997 A | * | 3/1988 | Hagin | B60K 6/12 60/405 |
| 4,760,697 A | * | 8/1988 | Heggie | B60K 6/12 180/165 |
| 5,140,170 A | * | 8/1992 | Henderson | F03D 11/02 290/44 |

(Continued)

FOREIGN PATENT DOCUMENTS

| | | |
|---|---|---|
| EP | 0 366 095 A2 | 5/1990 |
| EP | 1 628 028 A2 | 2/2006 |
| WO | WO 2011/116914 A1 | 9/2011 |

OTHER PUBLICATIONS

INPI Search Report for corresponding application FR 1255268 dated Feb. 28, 2013 (2 pages).

*Primary Examiner* — Thomas E Lazo
(74) *Attorney, Agent, or Firm* — Bookoff McAndrews, PLLC (57) ABSTRACT

Hydraulic apparatus for recovering energy, said apparatus comprising a hydraulic motor, and a high-pressure fluid source and a low-pressure fluid source. The apparatus has: an energy consumption mode, in which the fluid is transferred from the high-pressure fluid source to the low-pressure fluid source while driving the motor in rotation; and an energy accumulation mode, in which, by the action of the motor operating as a pump, the fluid is transferred from the low-pressure source to the high-pressure fluid source. The apparatus further comprises a pressure reducer disposed on a duct interconnecting the two fluid sources. In energy accumulation mode, if the level of the low-pressure source is tending to become excessively low, the reducer opens, enabling fluid to reach the low-pressure fluid source via the first duct.

12 Claims, 4 Drawing Sheets

(56) References Cited

U.S. PATENT DOCUMENTS

| | | |
|---|---|---|
| 6,769,251 B2 * | 8/2004 | Collet et al. .................... 60/405 |
| 6,817,175 B2 * | 11/2004 | Collet et al. .................... 60/405 |
| 7,082,757 B2 * | 8/2006 | Teslak ..................... B60K 6/12 180/165 |
| 7,677,037 B2 * | 3/2010 | Anderson et al. ............... 60/418 |
| 7,874,155 B2 * | 1/2011 | McBride et al. ................ 60/645 |
| 2004/0050042 A1 * | 3/2004 | Frazer ..................... B60K 6/12 60/413 |
| 2006/0068970 A1 | 3/2006 | Rose |
| 2008/0276607 A1 | 11/2008 | Anderson et al. |
| 2010/0300085 A1 * | 12/2010 | Schmuttermair ........ B60K 6/12 60/414 |
| 2012/0308404 A1 * | 12/2012 | Bauer et al. ..................... 417/46 |

\* cited by examiner

APPARATUS FOR RECOVERING ENERGY

CROSS REFERENCE TO RELATED APPLICATIONS

This application claims priority under 35 U.S.C. §119 to French Patent Application No. FR 1255268 filed Jun. 6, 2012, the contents of which are incorporated herein by reference.

FIELD OF THE INVENTION

The invention relates to apparatus for recovering energy, which apparatus is designed to equip a vehicle, and makes it possible to recover the kinetic energy dissipated while the vehicle is braking, and to use that energy to drive the vehicle when it starts moving again. Such apparatus is particularly useful on commercial vehicles having operating cycles with frequent stops and starts, such as urban buses, garbage trucks, goods-handling trucks, or indeed compactor rollers having tires.

Among such apparatus, the invention relates more particularly to hydraulic apparatus, which is particularly attractive due to its high power density (or high power-to-weight ratio).

BACKGROUND OF THE INVENTION

Hydraulic apparatus for recovering energy is defined herein as apparatus comprising:
- at least one hydraulic motor;
- a high-pressure fluid source; and
- a low-pressure fluid source;
- the apparatus being suitable for being operated in an energy consumption mode, in which the fluid is transferred from the high-pressure fluid source to the low-pressure fluid source while driving said at least one motor in rotation; and
- the apparatus being suitable for being operated in an energy accumulation mode, in which, by the action of said at least one motor operating as a pump, the fluid is transferred from the low-pressure fluid source to the high-pressure fluid source.

It can be understood that, in such apparatus, energy is stored in the high-pressure fluid source in the energy accumulation mode, and is delivered by said high-pressure fluid source in the energy consumption mode.

The term "fluid source" (high-pressure or low-pressure fluid source) is used to mean a receptacle (or a plurality of receptacles) for storing fluid, which receptacle, optionally in association with other hydraulic components, makes it possible, in an operating mode, to supply fluid under pressure at a pressure greater than atmospheric pressure. Such a fluid source can, in particular, be a hydraulic accumulator, or indeed a pressure-free fluid reservoir coupled to a pump suitable for pumping fluid from it and for delivering that fluid under pressure. It can be understood that in another operating mode (i.e. at some other time), the fluid source does not supply fluid, but rather it receives fluid in such a manner as to be filled again.

The term "hydraulic accumulator" is used to mean a storage capacity suitable for storing and for delivering a fluid under pressure, a fraction of the energy absorbed when the fluid enters the accumulator for storage therein being consumed when the fluid exits from the accumulator. A hydraulic accumulator can operate by gas compression, by means of a spring, or by some other means.

In the preceding definition, the fluid sources are referred to respectively as being "high-pressure" and "low-pressure" merely with reference to the respective parts they play in operation of the apparatus. When the apparatus is operating normally, they are subjected to pressures such that the "high-pressure" source has a pressure that is higher than the "low-pressure" source. But the two sources may be structurally identical.

When a vehicle including hydraulic energy-recovery apparatus is being designed, the volume and the weight of the accumulator require the designer of the vehicle to limit the on-board storage capacity, and to make a trade-off between the energy saving that can be made over an average operating cycle of the vehicle and the volume and/or the weight of the accumulator that is acceptable on board the vehicle.

The optimum trade-off is the one that makes it possible to minimize the weight and/or the size of the hydraulic accumulator, while also ensuring that the energy-recovery apparatus can perform the desired energy recovery and starting assistance functions.

Naturally, it is necessary, when performing such optimization, to provide continuity for the energy-recovery function (that optionally takes part in braking the vehicle), and above all for the starting assistance function.

Therefore, naturally, since the storage capacities of the accumulator are limited, as are the storage capacities of the fluid source, it can be understood that there is a risk of operation of the energy recovery system being interrupted when the level of fluid in one or the other of these storage capacities approaches allowable limit values, and in particular when the level of fluid in the high-pressure source approaches an upper limit, or when the level of fluid in the low-pressure source approaches a lower limit.

Usually, this risk is kept down to an acceptable level by providing an accumulator and a fluid source of high storage capacity, i.e. of storage capacity that is sufficiently high to ensure continuity for operation even under various operating conditions that are considered as extreme operating situations.

However, that leads to overdimensioning the accumulator, which is undesirable.

OBJECT AND SUMMARY OF THE INVENTION

Therefore, an object of the invention is to propose hydraulic apparatus for recovering energy (as defined above) that reconciles high continuity of operation with low accumulator volume and/or low fluid source volume.

This object is achieved by the facts that the apparatus further comprises a pressure reducer disposed on a first duct interconnecting the two fluid sources, and that the pressure reducer is arranged such that, in energy accumulation mode, if a filling indicator for indicating the level of filling of the low-pressure source is tending to become lower than a predetermined value, the reducer opens, enabling fluid to reach the low-pressure fluid source via the first duct.

This contribution of fluid tends to prevent (and generally makes it possible to prevent) the level of fluid in the low-pressure source from becoming less than a predetermined level.

The term "filling indicator" is used to mean a parameter representative of the level of filling. For example, for a gas-pressure accumulator, the pressure of the gas is a filling indicator.

A major difficulty encountered in conventional systems lies in the fact that when the low-pressure source is empty the system can no longer perform its function and must be switched off. That results in loss of performance and in discontinuity in operation of the vehicle.

Advantageously, by means of the invention, in this situation, when fluid being taken from the low-pressure source might cause the level of filling of that source to go below a minimum level that is required for the apparatus to operate properly, an injection of fluid taken from the high-pressure source and directed to the low-pressure source takes place via the pressure reducer, thereby preventing the level of the low-pressure source from going below said minimum level.

By means of this, the slowing-down functions remain guaranteed without any discontinuity in operation of the energy-recovery apparatus. The pressure of the fluid used by the apparatus for slowing down the motor is then equal to the pressure of the high-pressure source when the pressure reducer is opened.

In an embodiment, the apparatus further comprises a pressure limiter, disposed on a second duct interconnecting the two fluid sources, the limiter being suitable for opening when a filling indicator for indicating the level of filling of the high-pressure source is tending to exceed a predetermined value, in such a manner that the level of fluid in the high-pressure source cannot exceed a predetermined level. Preferably, this limiter is rated at the maximum pressure level that is acceptable for the accumulator.

One of the main difficulties encountered in conventional systems lies in the fact that when the high-pressure source is full the system can no longer perform its function and must be switched off. That results in loss of performance and in discontinuity in operation of the vehicle.

Advantageously, by means of the invention, in this situation, any fluid that, by being injected into the high-pressure source, would bring the level of filling to an excessive level is, instead, directed to the low-pressure source via the pressure reducer. In this way, the slowing-down functions of the system remain guaranteed. In addition, the position of the reducer enables it to operate in a manner that is imperceptible to the passengers or to the driver of the vehicle, i.e. without any discontinuity in operation of the system taking place when the reducer is opened.

In an embodiment, the apparatus further comprises a check valve disposed on a third duct interconnecting the two fluid sources, and enabling fluid to flow from the low-pressure source to the high-pressure source.

At the end of a vehicle acceleration stage assisted by the apparatus of the invention, it can happen that the level in the high-pressure source tends to go below a level considered as a minimum allowable for said source.

The taking of fluid from the high-pressure source must then be interrupted immediately.

Under these conditions, and as soon as the pressure in the high-pressure source is tending to become lower than the pressure in the low-pressure source, the third duct, under the control of the above-mentioned check valve, makes it possible to stop the taking of fluid from the high-pressure source.

The level of fluid in the high-pressure source going below an allowable minimum level is thus avoided.

In an embodiment, the apparatus is arranged in such a manner that, in energy recovery mode, the pressure in the low-pressure fluid source decreases over time.

For example, in the apparatus of the invention, preferably the high-pressure source may be constituted essentially by at least one fluid accumulator, and/or the low-pressure source may be constituted essentially by at least one pressure-free reservoir, or by at least one hydraulic accumulator.

In addition, the accumulator of the high-pressure fluid source and the accumulator of the low-pressure fluid source may be separate, i.e. there is then no mechanical link between the fluid storage chambers of the two accumulators, in particular any mechanical link causing the volumes of said chambers to vary simultaneously.

In the apparatus of the invention, the hydraulic motor(s) may be motors of fixed cylinder capacity.

In an embodiment, the apparatus further comprises a selection valve interposed between the motor and the high-pressure and low-pressure fluid sources; in the energy consumption mode and in the energy accumulation mode, the fluid passes through the motor in the same direction; and on going from the energy consumption mode to the energy recovery mode, the selection valve changes position, thereby reversing the direction of transfer of fluid between the fluid sources. Such a selection valve makes it simple to go from the energy accumulation mode to the energy consumption mode, in particular when the hydraulic motor(s) is/are of fixed cylinder capacity.

In an embodiment of the invention, in the apparatus, the first duct, and/or the second duct, and/or the third duct is connected in parallel between a high-pressure source duct and a low-pressure source duct connecting the high-pressure and low-pressure fluid sources respectively to the selection valve.

This arrangement enables the function of protecting the fluid sources that is imparted by the various items of equipment in question (respectively the pressure reducer, the pressure limiter, and the check valve) to be provided continuously, resulting from the fact that they cannot be isolated from the high-pressure/low-pressure fluid sources by the selection valve given their positions interposed between the fluid sources and the selection valve.

BRIEF DESCRIPTION OF THE DRAWINGS

The invention can be well understood and its advantages appear more clearly on reading the following detailed description of embodiments shown by way of non-limiting example. The description refers to the accompanying drawings, in which.

MORE DETAILED DESCRIPTION

The hydraulic energy-recovery apparatus 5 shown in FIGS. 1A to 1D comprises a hydraulic motor 10, a high-pressure fluid source 12 and a low-pressure fluid source 14. The motor 10 is a hydraulic motor having radial pistons, and a fixed cylinder capacity, of the type suitable for being declutched and re-clutched, in particular of the type suitable for being jaw-declutched and -reclutched by means of a driving dog. The fluid source 12 and the low-pressure fluid source 14 are hydraulic fluid accumulators of type known per se, namely of the gas compression type.

The closed circuit connecting the accumulators 12 and 14 to the motor 10 is also fed by a booster pump connected to a pressure-free reservoir. These elements are known per se and are not shown.

The hydraulic motor is coupled to a wheel 16 of a vehicle (not shown) on which the apparatus 5 is mounted.

For simplification reasons, the invention is presented with reference to only one motor and to only one wheel of a vehicle. However, it should be understood that, in general, apparatus of the invention includes a motor coupled to both of the wheels of a vehicle axle, or indeed, for example, two motors, each of the motors driving a respective wheel mounted on an axle of a vehicle.

The apparatus 5 constitutes assistance apparatus. Although not shown, the vehicle includes a main drive source in the form of an internal combustion engine that drives the wheels of a driven axle via a mechanical transmission. The apparatus 5 acts to provide assistance by supplying additional acceleration while the vehicle is starting to move, and by recovering kinetic energy while braking is taking place.

The feed and discharge fluid interchanges between the motor 10 and the two fluid sources 12 and 14 take place via a selection valve 20 in the following manner.

The selection valve 20 is interposed between the motor 10 and the accumulators 12, 14. Its main function is to enable the direction of flow of the fluid between the fluid sources 12, 14 to be inverted as a function of the operating mode of the hydraulic motor 10 (energy recovery or energy consumption).

A first main orifice 10A of the motor 10, via which orifice the feed fluid penetrates into the motor 10 in forwards operation, is connected via a duct 18A to a port A of the selection valve 20. The second main orifice 10B of the motor 10 is connected via a duct 18B to a port B of the valve 20.

The valve 20 also has a port C connected to the source 12 via a "high-pressure source" duct 24, and a port D connected to the source 14 via a "low-pressure source" duct 26.

The valve 20 is a valve having three positions I, II, III, controlled via two hydraulic chambers 20A, 20B and held by default in position II by return means. It is controlled by means of an electronic control unit that is not shown.

In position I, ports A and D are put into communication with each other, and ports B and C are put into communication with each other. In position III, ports A and C are put into communication with each other, and ports B and D are put into communication with each other. In position II, all four ports are isolated.

Due to the arrangement of the valve 20 that is interposed between the accumulators and the motor 10, both in energy consumption mode and in energy accumulation mode, the fluid flows through the motor in the same direction, so long as the direction of travel of the vehicle is the same (or more generally, so long as the direction of rotation of the mechanical element driven by the motor is the same).

As explained in detail below, going over from the energy consumption mode to the energy recovery mode takes place by changing the position of the selection valve 20 (switching between positions I and III). This change of position inverts the direction of transfer of fluid between the accumulators, without changing the direction of flow of the fluid through the motor 10.

The apparatus 5 also includes ducts 22, 32, 42 connecting the high-pressure source duct 24 (connected permanently to the source 12) to the low-pressure source duct 26 (connected permanently to the source 14).

A pressure limiter 15 of variable rating and controlled by the pressure in duct 24 is interposed on duct 22 (the "first duct").

A pressure reducer 30 of variable rating and controlled by the pressure in duct 26 is interposed on duct 32 (the "second duct").

A check valve 40 that allows fluid to flow only from duct 26 to duct 24 is interposed on duct 42 (the "third duct").

The apparatus 5 further includes a second pressure limiter 17 connecting the low-pressure fluid source to a pressure-free reservoir 4. This limiter avoids excessive pressure building up in the low-pressure fluid source.

Operation of the apparatus 5 is described in detail below.

Firstly, it should be noted that the apparatus 5 is assistance apparatus serving to improve the energy performance of the vehicle on which it is mounted, enabling the kinetic energy of the vehicle to be used rather than being dissipated uselessly.

Therefore, the apparatus 5 is used only during the vehicle acceleration or vehicle braking stages.

During the other stages, the apparatus 5 is declutched. During said other stages, the valve 20 is placed in the isolation position (II) in which the accumulators 12 and 14 are isolated from the motor.

In normal operation, the apparatus 5 is implemented such that, at all times, the pressure in accumulator 12 remains greater than the pressure in accumulator 14. In practice, the pressure in accumulator 12 varies in the range 100 bars to 300 bars, whereas the pressure in accumulator 14 varies in the range 15 bars to 40 bars.

In order to enable sufficient pressures to be maintained in accumulator 14, the apparatus 5 includes a feed or booster circuit (not shown) that maintains a pressure in accumulator 14 that is not less than a predetermined minimum pressure or "boost pressure."

Acceleration Stages

During the acceleration stages, and in particular the stages of the vehicle starting moving from a standstill, the apparatus 5 may be activated for procuring additional drive torque in addition to the drive torque delivered by the engine of the vehicle.

In order to activate the apparatus 5, the valve 20 is placed in position I or III depending on the direction of rotation that is to be imparted to the wheel 16: in position III in forwards operation in order to feed the motor via the orifice 10A; and in position I in reverse operation in order to feed the motor via the orifice 10B. At the same time, the motor 10 is jaw-clutched.

When the valve 20 is placed in one of the positions I or III, fluid is transferred from the source 12 to the accumulator 14 via the motor, under the effect of the difference between the pressures of said sources. The apparatus 5 goes from the state shown in FIG. 1A to the state shown in FIG. 1B. The pressure in the accumulator 12 decreases gradually from approximately 300 bars to approximately 100 bars.

Figure 1A:
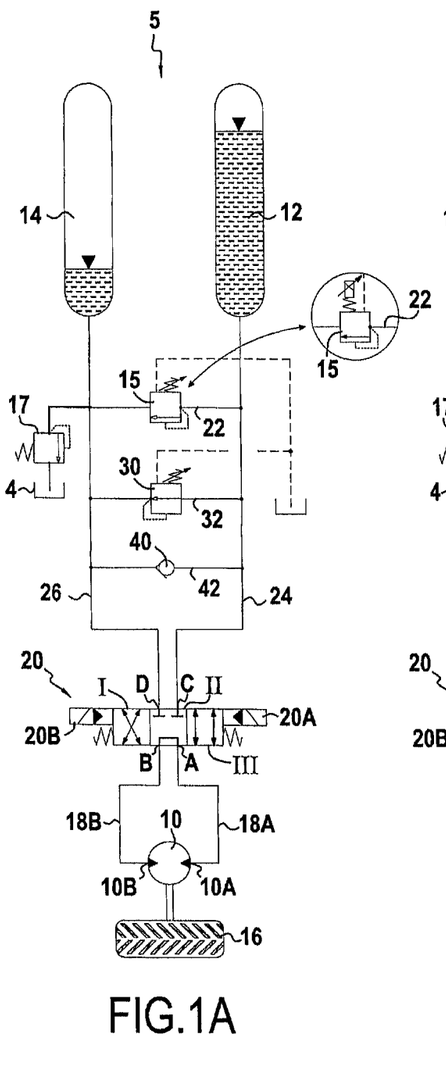
FIGS. 1A, 1B, 1C, and 1D are diagrammatic views of a first embodiment of apparatus of the invention, in various operating modes.
Figure 1B:
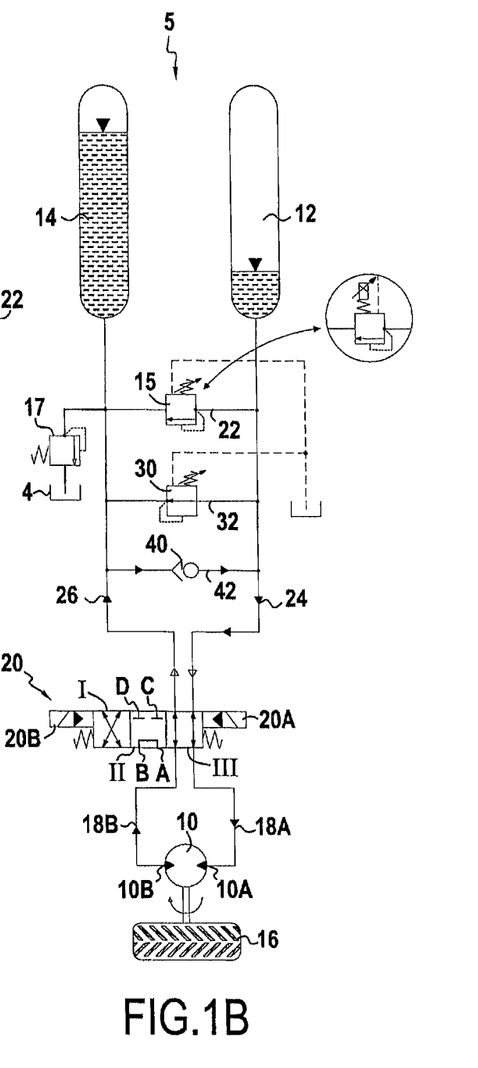

The fluid flowing through the motor 10 drives its rotor in rotation. The motor 10 thus delivers drive torque to its outlet shaft, thereby contributing to moving the vehicle in the desired direction.

The acceleration stages during which the apparatus 5 is activated correspond to a consumption mode during which the energy stored in the accumulator 12 is consumed.

Braking/Deceleration Stages

During the braking and/or deceleration stages, the apparatus 5 may be activated for procuring additional braking torque in addition to or in place of the braking torque delivered by the brakes of the vehicle. The purpose may then be to improve the braking capacities of the vehicle and/or to store energy in the accumulator 12 in order to limit the fuel consumption of the vehicle.

In order to activate the apparatus 5, the valve 20 is placed in such a manner as to enable the fluid to flow through the motor: in position I in forwards operation, or in position III in reverse operation. At the same time, the motor 10 is clutched.

Since the vehicle is traveling, the speed of rotation of the wheel is imposed by the speed of movement of the vehicle. The rotor of the motor 10 thus turns at an imposed speed. The motor 10 then operates as a pump and transfers fluid from accumulator 14 to accumulator 12, even though the pressure is higher in accumulator 12 than in accumulator 14.

Therefore, at the end of the braking/recovery stage, a certain quantity of fluid has been transferred from accumulator 14 to accumulator 12, and the pressure in accumulator 12 has increased while the pressure in accumulator 14 has decreased.

For example, conversely to what happens in the acceleration stage, during the braking/deceleration stage, the pressure in accumulator 12 can increase from 100 bars to 300 bars, while the pressure in accumulator 14 decreases from 40 bars to 15 bars.

The braking/deceleration stages thus make it possible to maintain a difference between the pressures in the sources 14 and 12, and to maintain these two sources as far as possible at intermediate levels, making it possible to satisfy both a braking need and an acceleration need.

The braking/deceleration stages during which the apparatus 5 is activated correspond to a recovery mode during which energy is stored in the accumulator 12.

However, depending on the circumstances encountered while the vehicle is being driven, it can happen that the level in one or the other of the accumulators 12 or 14 reaches either a maximum value or a minimum value beyond which the level should not go so as not to damage the accumulator in question.

Saturation of Accumulator 12 (High-Pressure Source)

Figure 1C:
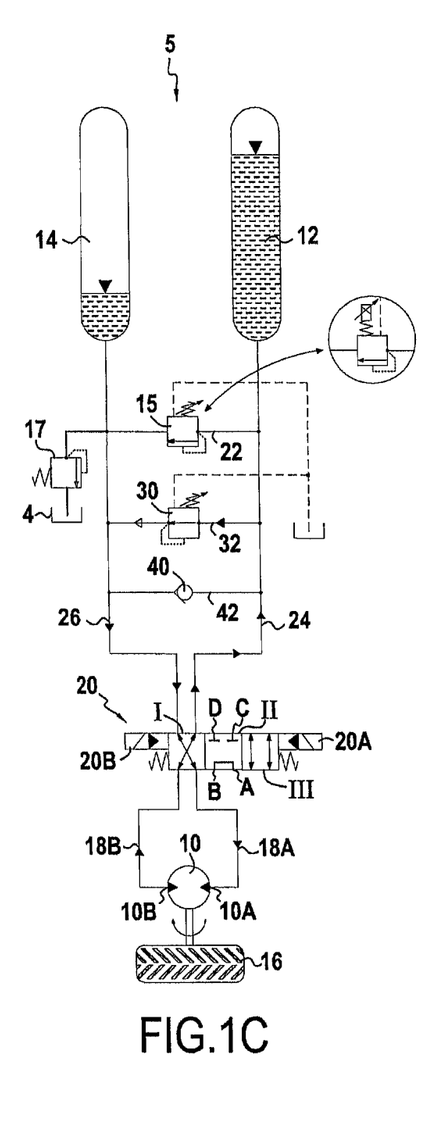
Figure 1D:
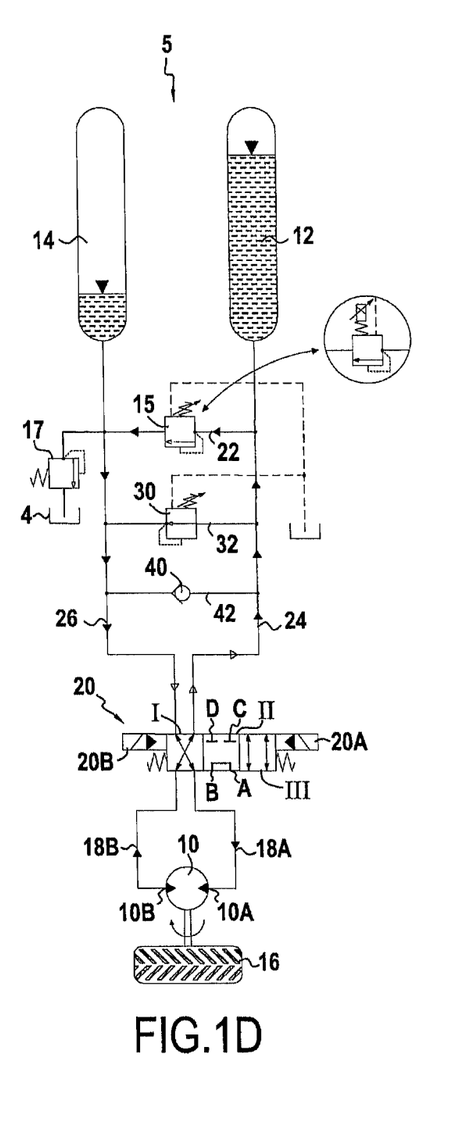

A first situation occurs when the level of filling of accumulator 12 exceeds an allowable maximum value (FIG. 1D). For a gas-pressure accumulator, the filling indicator is merely the pressure in the accumulator (this indicator could be a degree of compression of the spring when the accumulator is an accumulator having a spring).

In this situation, in accordance with the invention, the pressure limiter 15 is rated at a pressure equal to the allowable maximum pressure for accumulator 12 (which is 300 bars in this example).

Thus, when, during a braking/deceleration stage, the pressure in accumulator 12 is tending to exceed the acceptable maximum pressure, pressure limiter 15 opens, thereby enabling fluid to be removed to the accumulator 14. In this way, filling of accumulator 14 is interrupted and damage caused to said accumulator by excessive filling is avoided.

Exhaustion of Accumulator 14 (Low-Pressure Source)

A second situation occurs when the level of filling of accumulator 14 is tending to go below an allowable minimum value (FIG. 1C). Both for accumulator 14 and for accumulator 12, the filling indicator is merely the pressure in the accumulator.

With a view to such circumstances occurring, the pressure reducer 30 is rated at a pressure equal to the minimum pressure that is acceptable for accumulator 14, namely 15 bars.

Thus, when, during a braking/deceleration stage, the pressure in accumulator 14 is tending to go below the acceptable minimum pressure, pressure limiter 30 opens, thereby enabling accumulator 12 to be put into communication with accumulator 14 via duct 32, and therefore enabling fluid to be injected into accumulator 14. In this way, emptying of accumulator 14 is interrupted, and excessive emptying of said accumulator due to excessively long taking of fluid is avoided.

Exhaustion of Accumulator 12 (High-Pressure Source)

A third situation occurs when the level of filling of accumulator 12 is tending to go below an allowable minimum value (FIG. 1B), during an acceleration stage.

In this situation, drive torque remains expected on the outlet shaft of the motor 10, whereas accumulator 12 is tending to become empty. Due to fluid being taken from accumulator 12, the pressure therein decreases, and goes below an allowable minimum level.

Let us assume firstly that the apparatus 5 does not have either a check valve 40 or a duct 42.

Under these conditions, as soon as it is detected that the level in accumulator 12 has become too low, then, in order to remedy the problem, one solution may consist in causing the valve 20 to go over to position I, and thus to trigger filling of accumulator 12. This filling can then be continued for a brief instant, until the pressure in accumulator 12 has returned to an acceptable value. The valve 20 can then be placed in position II, in order to end the hydraulic assistance.

However, such a manner of proceeding is not fully satisfactory, because the valve 20 has a relatively long reaction time. Thus, even very rapid triggering of said valve does not prevent occasional sudden and sharp drops in pressure in duct 24 and accumulator 12 (such a drop in pressure being, however, stopped rapidly by the valve 20 going over to position I).

It is to avoid the negative mechanical effects of such a drop in pressure that the apparatus 5 is equipped with the check valve 40 and with the line 42. In the presence of the check valve 40, on the line 42, the apparatus 5 operates as follows:

At the end of the acceleration stage that led the pressure in the high-pressure accumulator 12 to go below the allowable minimum value, the pressure in the low-pressure accumulator 14 reaches a relatively high value (for accumulator 14). Usually, this relatively high value is greater than the allowable minimum pressure in the high-pressure accumulator 12.

Thus, when the apparatus 5 includes the check valve 40 and the line 42, as soon as the pressure in accumulator 12 goes below the pressure in accumulator 14, the check valve 40 opens, and the taking of fluid from accumulator 12 is interrupted and continues from duct 26, thereby making it possible to feed fluid to the motor 10 via its orifice 10A.

Thus, a reduction in pressure in accumulator 12 to below the allowable minimum pressure is avoided.

The check valve 40 makes it impossible for the pressure in the high-pressure accumulator 12 to become less than the pressure in the low-pressure accumulator 14.

Figure 2:
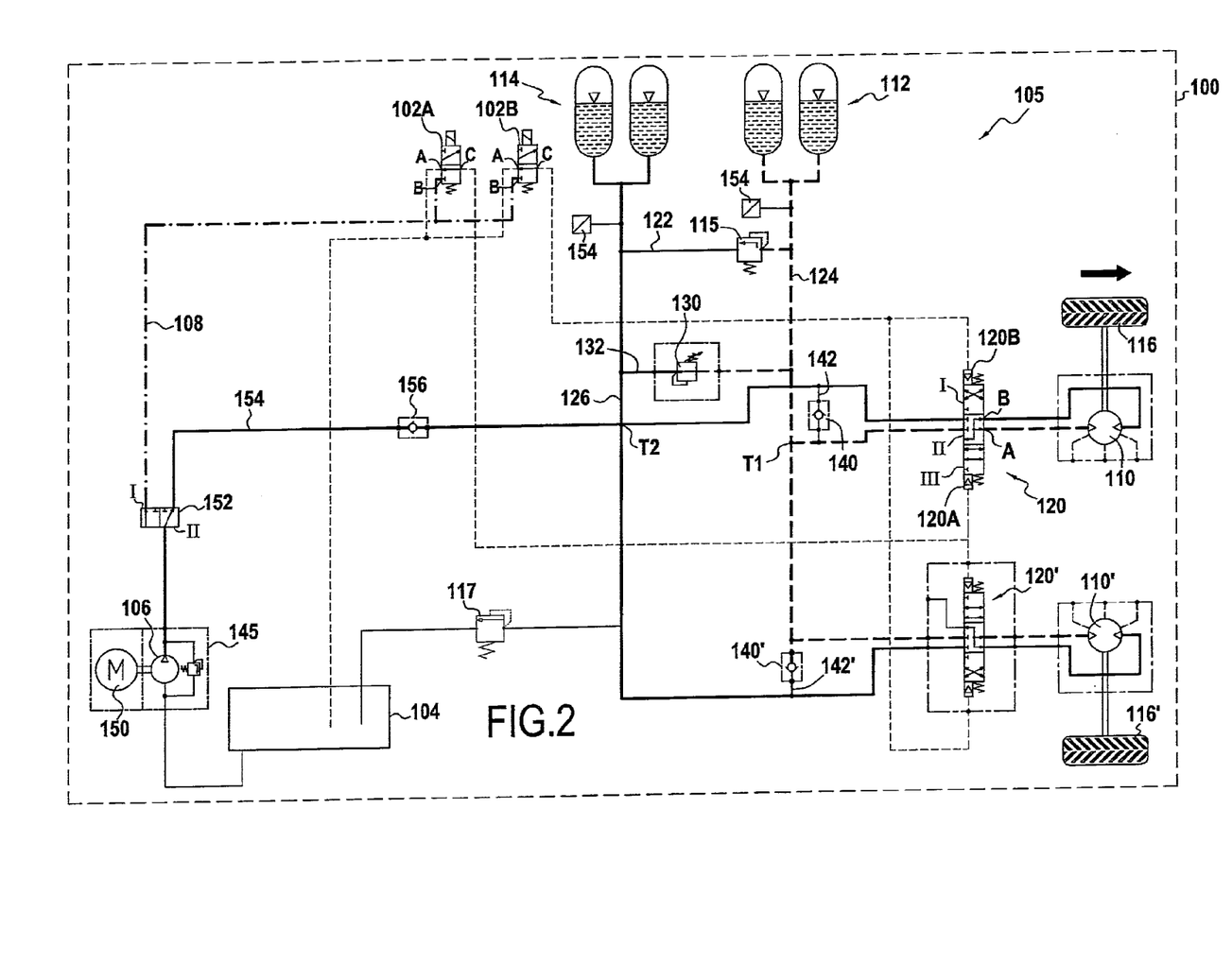
FIG. 2 is a diagrammatic view of a second embodiment of apparatus of the invention.
Figure 3:
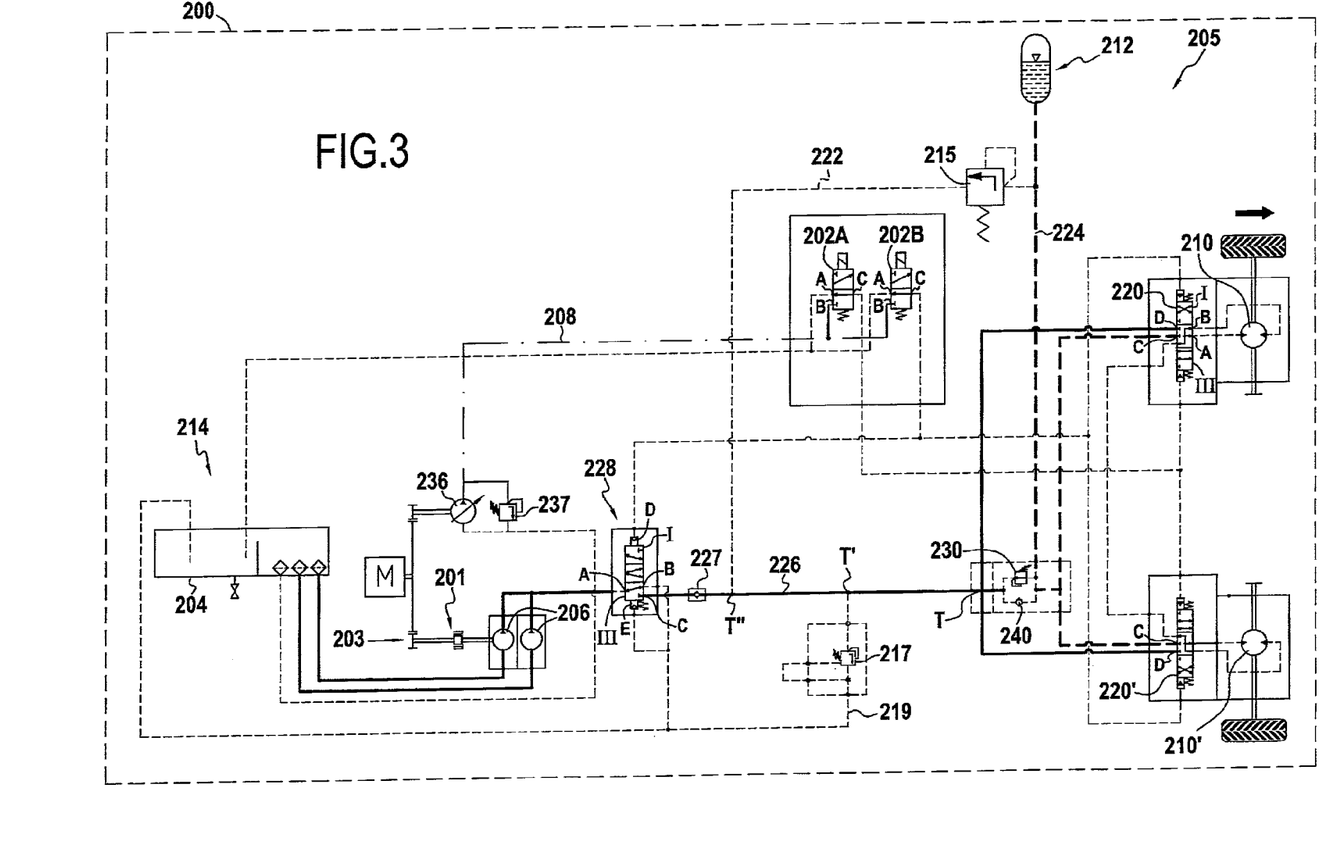
FIG. 3 is a diagrammatic view of a third embodiment of apparatus of the invention.

FIGS. 2 and 3 show second and third embodiments of the invention. In these figures, elements that are identical or similar to the elements of the first embodiment (or of the second embodiment) are identified by the numerical references of FIG. 1A (or, respectively, FIG. 2) plus 100 (or 200).

FIG. 2 shows hydraulic energy-recovery apparatus 105 equipping a vehicle 100. This apparatus 105 is generic apparatus, applicable to any type of vehicle. In the vehicle 100, the main drive source (not shown) may thus be an internal combustion engine, or indeed an electric motor, the vehicle 100 then being, for example, an electric vehicle such as an electric bus.

The apparatus 105 serves to reduce the energy consumption of the vehicle 100, thereby either enabling the weight of the batteries necessary for operating the vehicle to be minimized, or enabling the vehicle's fuel consumption to be minimized.

The apparatus 105 comprises two hydraulic motors 110 and 110', a high-pressure fluid source 112, and a low-pressure fluid source 114. The motors 110 and 110' are declutchable hydraulic motors, of the same type as the preceding motor 10.

They are coupled to wheels 116 and 116' of the vehicle 100.

Each of the fluid sources 112 and 114 is constituted by uniting two hydraulic fluid accumulators having their orifices interconnected: The orifices of the accumulators of the high-pressure source 112 are connected to a high-pressure source duct 124; the orifices of the accumulators of the low-pressure source 114 are connected to a low-pressure source duct 126.

The hydraulic circuit is arranged symmetrically for the two wheels 116 and 116', and thus the fluid interchanges between the fluids sources 112, 114 and motor 110 take place in exactly the same manner, and via the same components as with motor 110'. Thus, the description is given with reference only to fluid interchanges between the motor 110 and the sources 112, 114. It is merely noted that, in order to enable fluid interchanges to take place between the sources 112, 114 and the two motors 110, 110', the ducts 124, 126 split into two at two junctions referenced respectively T1 and T2.

The feed and discharge fluid interchanges between the motor 110 and the fluid sources 12 and 14 take place via a selection valve 120 identical to the valve 20. The motor 110 is connected to two ports A and B of the valve 120 as the motor 10 is to the valve 20.

The valve 120 has three positions like the valve 20, and operates like that valve. Its two hydraulic control chambers 120A and 120B are controlled by respective ones of two two-position hydraulic solenoid valves 102A and 102B, arranged as follows:

Each of the valves 102A and 102B has two inlet ports A and B, and one outlet port C.

The inlet ports A are connected together to a pressure-free reservoir 104.

The inlet ports B are connected together, and are either isolated or connected to the delivery orifice of an auxiliary pump or a booster pump 106, via a duct 108, as a function of the position of a valve 152 disposed on the duct 108, as indicated below.

The outlet port C of the valve 102A is connected to the two hydraulic chambers 120A, 120'B respectively of the valves 120 and 120', the pressure of which chambers tends to cause the valves 120, 120' to go into position III.

The outlet port C of the valve 102B is connected to the two hydraulic chambers 120B, 120'B respectively of the valves 120 and 120', the pressure of which chambers tends (conversely to the chambers 120A, 120'A) to cause the valves 120, 120' to go into position I.

By the pressure in their ports C, the valves 102A and 102B thus make it possible to place the valves 120 and 120' in any one of their three positions.

The pump 106 is driven in rotation by a filling electric motor 150, electrically powered by the batteries of the vehicle 100. The assembly constituted by the pump 106 and by the motor 150 forms an electrically driven pump unit 145 (on a vehicle propelled by an internal combustion engine, the pump 106 could be driven by the engine: see the embodiment in FIG. 3).

The above-indicated selection valve 152 having two positions I and II is disposed on the duct 108. In position I, the valve 152 puts the delivery orifice of the pump 106 into communication with the inlet ports B of the valves 102A and 102B as indicated above. This position thus enables the valves 102A and 102B to be made operational, and thus enables the apparatus 105 to operate.

In position II, the valve 152 puts the delivery orifice of the pump 106 into communication with duct 126 via a link duct 154. A check valve 156 disposed on this duct 154 prevents any fluid from backing up the duct 126 towards the pump 106. The valve 152 is placed in this second position when the quantity of fluid in the hydraulic circuit is too small, and when it is necessary for the accumulators to be filled by the pump 106.

The apparatus 105 operates in the following manner (the description corresponds to the situation in which the vehicle 100 is traveling in the direction that causes fluid to flow through the motors 110, 110' from left to right, in FIG. 2):

Acceleration and Braking Modes with Hydraulic Assistance

In order to activate the apparatus 105 and in order to cause it to go into acceleration mode (energy consumption) or into braking mode (energy recovery), the following operations are performed:

the motor 150 is started so as to drive the pump 106;

the valve 152 is placed in position I, whereby the delivery pressure of the pump 106 applies to the inlet ports B of the valves 102A and 102B; and the valves 102A and 102B are placed in the positions that lead the valves 120 and 120' to be placed in the desired operating position, namely:

In braking mode (energy recovery), the valve 102B that is a braking/deceleration pilot valve is activated and is placed in a pressurizing position, in which the delivery pressure of the pump 106 is transmitted to the chambers 120B and 120'B. The valve 102A that is an acceleration pilot valve remains in the zero pressure position, and the chambers 120A and 120'A remain connected to the pressure-free reservoir. The valves 120 and 120' are thus placed in position I.

In acceleration mode (energy consumption), the valve 102A (acceleration pilot valve) is placed in a pressurizing position, in which the delivery pressure of the pump 106 is transmitted to the chambers 120A and 120'A. The valve 102B remains in the zero pressure position, in which the chambers 120B and 120'B are connected to the pressure-free reservoir 104. The valves 120 and 120' are thus placed in position III.

Inactive Mode:

Conversely, during the periods for which the apparatus 105 remains inactive, the valve 152 is placed in position II, thereby placing the delivery orifice of the pump 106 in communication with duct 126 via duct 154.

Under these conditions, so long as the electric motor 150 is not started, the delivery pressure of the pump remains zero, and no fluid flows through duct 154. However, if the pressure in the low-pressure accumulator 114 becomes less than a predetermined threshold and if, simultaneously, the pressure in the high-pressure accumulator 112 is also less than a second predetermined threshold, the motor 150 is started (these pressure are measured by sensors 154). The delivery pressure of the pump is exerted in the duct 154, thereby causing the low-pressure accumulator 114 to be filled until the pressure in said low-pressure accumulator reaches the delivery pressure of the pump 106.

In addition, in this operating mode, since the valves 120 and 120' are in position II, the feed and discharge orifices of the motor 110 are interconnected, as are those of the motor 110'; these motors are then in freewheel mode.

In the apparatus 105, the pressure reducer 115, the pressure limiter 130, and the two check valves 140 and 140' perform the same functions respectively as the pressure reducer 15, the pressure limiter 30, and the check valve 140 of the apparatus 5.

FIG. 3 shows a third embodiment of the invention.

FIG. 3 shows hydraulic energy-recovery apparatus 205 equipping a vehicle 200, and very similar to the apparatus 105. Unless otherwise indicated, the apparatus 205 is identical to the apparatus 105. Elements that are identical or similar bear like numerical references plus 100.

The vehicle 200 is driven by an electric motor or by an internal combustion engine, this motor or engine being referenced M.

The difference between the apparatus 105 and the apparatus 205 lies in the type of low-pressure source 214 used.

The low-pressure source 214 is constituted mainly by a pressure-free reservoir 204 (i.e. a reservoir remaining at atmospheric pressure) to which a set of twin pumps are connected, which, in this example, are two twin booster pumps 206, disposed in such a manner as to be capable of drawing off fluid from the reservoir 204.

The booster pumps 206 are driven by the outlet shaft of a clutch 201 connected via gearing 203 to the outlet shaft of the motor or engine M. Depending on its position, the clutch 201 thus enables the pumps 206 to be activated or not activated, when the motor M is operating.

The (interconnected) delivery orifices of the pumps 206 are connected to selection valves 220, 220' identical to the valves 120, 120' of the apparatus 105 via a low-pressure source duct 226. This duct 226 splits into two at a junction T in order to direct a fraction of the fluid towards valve 220 and another fraction towards valve 220'.

In the direction going from the pumps 206 towards the junction T (then towards the valves 220, 220'), the duct 226 has three items of equipment in succession: a directional control valve 228, a check valve 227, and the connection junction T' for connection to a pressure limiter 217.

The directional control valve 228 is a selection valve having three positions I, II, III.

The directional control valve 228 has an upstream port A connected to the delivery orifices of the pumps 206 via an upstream portion of duct 226.

It has two downstream ports B and C: Port B is connected to the reservoir 204; port C is connected to ports D of valves 220 and 220' via the downstream portion of duct 226.

The directional control valve 228 is controlled by two opposing hydraulic chambers D and E. Port D is connected to port C of valve 202B, while port E is connected to the reservoir 204. Valve 228 is urged by a return spring into a first position I. This position is thus taken up when the pressure in the chamber D is low, i.e. when the valve 202B is not actuated.

In position I, port B is isolated, and ports A and C are interconnected, in such a manner that the fluid delivered by the pumps 206 is directed towards the downstream portion of duct 226. This position thus makes it possible to feed fluid, at relative low pressure, to the motors 210 and 210'.

Position II is an intermediate position used only transiently for limiting the mechanical forces while the directional control valve 228 is going from position I to position III. In position II, all three ports A, B, and C are interconnected.

In position III, port C, connected to the downstream portion of duct 226, is isolated; the fluid delivered by the pumps 206 is directed towards the reservoir 204.

The pressure limiter 217 serves to limit, and thus to maintain, the pressure in duct 226. It protects this duct from excessive pressure, like the limiters 17 or 117. It is disposed on a link duct 219 that connects duct 226 to the reservoir 204, and that is connected to duct 226 at the above-mentioned junction T'.

The apparatus 205 also includes a pressure limiter having the same function as the limiter 115 of the apparatus 105 or the limiter 15 of the apparatus 5, namely avoiding a fluid level that is unacceptable in the accumulator 212. This pressure limiter 215 is disposed on a duct 222 that connects the high-pressure source duct 224, connected to accumulator 212, to duct 226. Duct 222 is connected to duct 226 at a junction T''', situated between the directional control valve 228 and the junction T'.

Finally, the check valve 227, disposed on duct 226 between the directional control valve 228 and the junction T', prevents any flow of fluid from the valves 220, 220' towards the valve 228. Thus, when the pumps 206 are declutched, and in the event that the directional control valve 228 is leaking or is merely slow to switch, the check valve prevents the pumps 206 from turning in the direction opposite to the preferred direction for removing fluid from duct 226 towards the reservoir 204.

The apparatus 205 further includes two valves 202A and 202B that are identical to the valves 102A and 102B. In these valves 202A and 202B:
the inlet ports A are connected together to a pressure-free reservoir 204;
the inlet ports B are connected to the delivery orifice of a pump 236, via a duct 208; and
the outlet ports C are connected to the valves 220 and 220' in the same manner as the outlet ports of the valves 102A, 102B.

Thus, the valves 202A and 202B make it possible to place the valves 220 and 220' in any one of their three positions.

The pump 236 is a control pump, actuated continuously by the motor M when said motor is operating. Said pump delivers a control pressure that is used by the valves 202A and 202B. It can also feed fluids to other accessories (not shown) of the vehicle 200.

The valve 236 is equipped with a pressure limiter 237 that enables fluid to return from the delivery orifice of the pump 236 to its feed orifice (connected to the reservoir 204), if the fluid pressure at the delivery orifice exceeds the desired control pressure.

The apparatus 205 also includes a pressure reducer 230 having the same function as the reducer 130 of the apparatus 105 or as the reducer 30 of the apparatus 5, and a check valve 240 having the same function as the check valves 140, 140' of the apparatus 105 or as the check valve 40 of the apparatus 5.

As in the apparatus 5 and as in the apparatus 105, these elements (215, 230, 240) are interposed between the high-pressure duct, namely the duct 224 connecting accumulator 212 to ports C of valves 220 and 220', and the low-pressure duct, namely duct 226.

The apparatus 205 operates in the following manner:

Inactive Mode

Outside the acceleration and braking stages during which hydraulic assistance is desired (i.e. it is desired to use the hydraulic apparatus 205), the clutch 201 is deactivated, and the pumps 206 are therefore declutched from the motor M.

In this mode, the pump 236 remains activated continuously. Valves 202A and 202B can thus, at any time, be activated to cause valves 220 and 220' to go into position I or position III and thus to enable the apparatus 205 to be used for delivering additional drive force or, conversely, for braking.

In this embodiment, the directional control valve 228 remains in position III, which is the position for emptying the pumps 206.

Waiting Mode

When it is assumed that the apparatus 205 is going to be used imminently for braking, the apparatus 205 can be placed in a waiting mode, or in an active control mode, making it possible to go over more rapidly and more smoothly to braking mode.

In this waiting mode, the clutch 201 is activated, whereby the pumps 206 are actuated. Conversely, neither of the valves 202A or 202B is activated. As a result, the directional control valve 228 remains in position III, so that the fluid pumped by the pumps 206 is directed towards the reservoir 204.

The advantage of this operating mode is that it makes it possible to go over to braking mode very rapidly, because the pumps 206 are actuated and are delivering through duct 226 (or rather, through the upstream portion of said duct).

Acceleration and Braking Modes

On the vehicle 200, acceleration and braking can be assisted by means of the apparatus 205.

Naturally, the possibility of using the apparatus 205 for either of these functions depends on the level of fluid in the accumulator 212. When the accumulator is relatively full, the apparatus 205 can deliver a supplementary drive force, for acceleration. Conversely, when it is relatively empty, the apparatus 205 can be used only to contribute an additional braking force.

Since valves 202A and 202B continuously receive the control pressure provided by the pump 236 (co-operating with the pressure limiter 237), they can be actuated at any time for placing the valves 220 and 220' in either of the positions I or III.

Therefore, merely by activating valves 202A and 202B, it is possible to place the apparatus 205 in acceleration mode or in deceleration/braking mode. In these operating modes, the apparatus 205 operates analogously to the corresponding modes of the apparatus 5 or of the apparatus 105.

However, the parts played by pumps 206 and by valve 228 in braking mode and in acceleration mode need to be specified with more details.

The following description concerns the vehicle movement mode in which the fluid is fed to the motors 210, 210' via orifices A of valves 220, 220', and is removed from the motors towards orifices B of valves 220, 220'. It can be understood that, while the vehicle is moving in the opposite direction, the following explanations should be adapted accordingly.

In the acceleration stage, valve 202A is activated, without activating valve 202B. Valves 220 and 220' are thus placed in position III. The pressurized fluid exiting from accumulator 212 actuates motors 210, 210' that thus deliver booster drive torque; the fluid is removed from the motors via the downstream segment of duct 226, and into the reservoir 104 via duct 219 and via the pressure limiter 217. The clutch 201 and the pumps 206 remain inactive.

Conversely, in braking mode, the clutch 201 is actuated, thereby actuating the pumps 206 (unless they have already been actuated by previously going over to waiting mode).

Valve 202B is then activated, without activating valve 202A.

Under the effect of the pressure in port C of valve 202B, and thus in the hydraulic chamber D of valve 228, the valve 228 is positioned in position I and thus directs the fluid delivered by the pumps 206 towards the downstream segment of duct 226.

Valves 220 and 220' are thus placed in position I. A fraction of the pressurized fluid delivered by the pumps 206 is sucked in by the motors 210 and 210' operating as pumps and is delivered at high pressure into accumulator 212. The remainder of the fluid delivered by the pumps 206 returns to the reservoir 204 via duct 219, and via the pressure limiter 217. The apparatus 205 thus performs the energy recovery function, while also performing a braking function due to the braking torque developed by the motors 210 and 210'.

If, during the braking mode, the level of fluid in accumulator 212 reaches an unacceptable value, i.e. if this accumulator is tending to become full, the pressure limiter 215 opens. The surplus fluid is then directed towards duct 226 via duct 222, and, from there, returns to the reservoir 204 via duct 219.

Conversely, during the braking mode, it can happen that the pressure in duct 226 goes below the threshold value triggering opening of the pressure limiter 230. The limiter 230 then opens and enables fluid to flow from duct 224 to duct 226. This then enables the fluid coming from accumulator 212 via duct 224 to feed the motors 210, 210', operating as pumps, this fluid feed acting as substitute for the reservoir 204 which is incapable of supplying the fluid necessary for feeding the motors.

Such a failure in the supply of fluid to duct 226 can have various causes: The directional control valve 228 can be jammed in position III, causing the fluid to return directly to the reservoir 204; the circuit as a whole can lack fluid, because of leaks, causing the reservoir 204 to be emptied entirely; or indeed, the clutch 201 or the pumps 206 can be faulty.

Finally, the check valve 240 plays substantially the same part as the check valve 40 in the apparatus 5.

Thus, at the end of an acceleration stage, the pressure in the accumulator 212 can tend to become less than the pressure in the line 226, namely the rating pressure imposed by the pressure limiter 217.

Under these conditions, as soon as the pressure in accumulator 12 goes below the pressure in the line 226, the check valve 240 opens, and the taking of fluid from accumulator 12 is therefore interrupted and feed to the motors continues from duct 226.

The check valve 240 makes it impossible for the pressure in the high-pressure accumulator 12 to become less than the rating pressure of the pressure limiter 217.

Thus, in the various operating modes described above, in apparatus 205, the pressure limiter 215, the pressure reducer 230, and the check valve 240 play the same parts respectively as the pressure limiter 15 or 115, as the pressure reducer 30 or 130, as the check valve 40, or as the check valves 140 in the apparatus 5 or in the apparatus 105, under the specific circumstances already explained for the apparatus 5 and for the apparatus 105.

What is claimed is:

1. Hydraulic apparatus for recovering energy, said apparatus comprising:
    at least one hydraulic motor;
    a high-pressure fluid source; and
    a low-pressure fluid source suitable for supplying fluid at a "low" pressure, greater than atmospheric pressure;
    the apparatus being suitable: for being operated in an energy consumption mode, in which the fluid is transferred from the high-pressure fluid source to the low-pressure fluid source while driving said at least one motor in rotation; and for being operated in an energy accumulation mode, in which, by the action of said at least one motor operating as a pump, the fluid is transferred from the low-pressure fluid source to the high-pressure fluid source;
    wherein the apparatus further comprises a pressure reducer disposed on a first duct interconnecting the two fluid sources;
    the pressure reducer being arranged such that, in energy accumulation mode, if a filling indicator for indicating the level of filling of the low-pressure source is tending to become lower than a predetermined value, the reducer opens, enabling fluid to reach the low-pressure fluid source via the first duct.

2. Hydraulic apparatus according to claim 1, further comprising a pressure limiter, disposed on a second duct interconnecting the two fluid sources, the limiter being suitable for opening when a filling indicator for indicating the level of filling of the high-pressure source is tending to exceed a predetermined value, in such a manner that the level of fluid in the high-pressure source cannot exceed a predetermined level.

3. Hydraulic apparatus according to claim 2, further comprising a check valve disposed on a third duct interconnecting the two fluid sources, and enabling fluid to flow from the low-pressure source to the high-pressure source.

4. Hydraulic apparatus according to claim 1, further comprising a check valve disposed on a third duct interconnecting the two fluid sources, and enabling fluid to flow from the low-pressure source to the high-pressure source.

5. Hydraulic apparatus according to claim 1, wherein the high-pressure source is constituted essentially by at least one fluid accumulator.

6. Hydraulic apparatus according to claim 1, wherein the low-pressure source is constituted essentially by at least one pressure-free reservoir or by at least one hydraulic accumulator.

7. Hydraulic apparatus according to claim 1, further including a second pressure limiter, interposed on a duct connecting the low-pressure fluid source to a pressure-free reservoir.

8. Hydraulic apparatus according to claim 1, further comprising a selection valve interposed between said fluid sources and said at least one motor, and wherein, in the energy consumption mode and in the energy accumulation mode, the fluid passes through said at least one motor in the same direction; and on going from the energy consumption mode to the energy recovery mode, the selection valve changes position, thereby reversing the direction of transfer of fluid between the fluid sources.

9. Hydraulic apparatus according to claim 8, wherein said first duct, and/or said second duct, and/or said third duct is connected in parallel between a high-pressure source duct and a low-pressure source duct connecting said high-pressure and low-pressure fluid sources respectively to said selection valve.

10. Hydraulic apparatus according to claim 1, wherein said at least one hydraulic motor is a motor having a fixed cylinder capacity.

11. Hydraulic apparatus according to claim 1, arranged in such a manner that, in energy recovery mode, the pressure in the low-pressure fluid source decreases over time.

12. Hydraulic apparatus according to claim 1, wherein the high-pressure source and the low-pressure source are constituted essentially by fluid accumulators, and wherein the accumulator of the high-pressure fluid source and the accumulator of the low-pressure fluid source are separate.

* * * * *